United States Patent [19]

Kong

[11] Patent Number: 5,953,396
[45] Date of Patent: Sep. 14, 1999

[54] TELEVISION RECEIVER FOR RECEIVING VOICE/TEXT MESSAGE AND VOICE/TEXT MESSAGING METHOD USING THE SAME

[75] Inventor: Won-keun Kong, Suwon, Rep. of Korea

[73] Assignee: Samsung Electronics Co., Ltd., Kyungki-do, Rep. of Korea

[21] Appl. No.: 08/927,286

[22] Filed: Sep. 11, 1997

[30] Foreign Application Priority Data

Sep. 30, 1996 [KR] Rep. of Korea ........................ 96-43128

[51] Int. Cl.⁶ .................................................. H04M 11/00
[52] U.S. Cl. ..................................... 379/93.12; 379/93.17
[58] Field of Search ........................... 379/93.01, 93.03, 379/93.17, 93.18, 93.23, 93.24, 93.25, 93.26, 93.27, 93.21, 110.01, 90.01, 468, 461; 348/552, 62, 14, 9, 13; 340/825.19

[56] References Cited

U.S. PATENT DOCUMENTS

| | | | |
|---|---|---|---|
| 5,396,546 | 3/1995 | Remillard | 379/93.19 |
| 5,404,393 | 4/1995 | Remillard | 379/96 |
| 5,479,498 | 12/1995 | Brandman et al. | 379/283 |
| 5,489,491 | 2/1996 | Garcia et al. | 379/88 |
| 5,490,208 | 2/1996 | Remillard | 379/93.19 |
| 5,524,141 | 6/1996 | Braun et al. | 379/93 |
| 5,706,334 | 1/1998 | Balk et al. | 379/93.17 |
| 5,724,412 | 3/1998 | Srinivasan | 379/93.23 |

*Primary Examiner*—Fan S. Tsang
*Attorney, Agent, or Firm*—Sughrue, Mion, Zinn, Macpeak & Seas, PLLC

[57] ABSTRACT

A television receiver (110) is provided for receiving combination voice/text messages from an external host computer (140) which stores both text and voice information. The television contains a modem (116) which modulates an information request signal output by a controller (113), in response to a user input, to transmit the modulated signal to the host computer (140). The modem (116) also demodulates message signals received from the host computer (140). The received message signals may contain either text information, voice information, or a combination of both text and voice information. The television receiver (110) also contains a TV signal processor (112) which demodulates the broadcast TV signal to generate a TV video signal and a TV audio signal. The TV signal processor (112) also separates any message signals received via the modem (116) into a video information signal and an audio information signal and then combines the video information signal with the TV video signal and the audio information signal with the TV audio signal. The combined video information signal/TV video signal is displayed on the television screen (111). The combined audio information signal/TV audio signal is output via the television's audio speaker (117).

4 Claims, 2 Drawing Sheets

TELEVISION RECEIVER FOR RECEIVING VOICE/TEXT MESSAGE AND VOICE/TEXT MESSAGING METHOD USING THE SAME

BACKGROUND OF THE INVENTION

1. Field of the Invention

The present invention relates to an apparatus and method for voice/text messaging. More particularly, the present invention relates to a television receiver having capability of receiving a voice/text message. Additionally, the present invention relates to a voice/text messaging method using the television receiver. This application for television voice/text messaging is based on Korean Patent Application No. 96-43128, which is incorporated by reference herein for all purposes.

2. Description of the Related Arts

In case that a message is desired to be transmitted via a telephone line when a receiver is absent, a private answering machine has been used to record and reproduce the message for the receiver. Alternatively, a voice messaging service has been provided for the purpose by a communications service provider using a host computer. In such systems, however, the information is output by a speaker in a telephone handset or in other devices having a speaker. Accordingly, the type of the transmitted information is restricted to voice signals, and information in a form of text or graphics cannot be received. Also, a deaf person cannot use such devices.

By using an electronic mail (e-mail) service, one can store a message in a host computer of a service provider so that the message is read by a receiver. However, a person who wants to use the e-mail service needs to be equipped with a computer. Furthermore, a typical e-mail service cannot transfer voice information easily.

Recently, a pager which can display information other than telephone numbers is being commercialized. However, such a pager can display only a small amount of text information. Thus, the information cannot be received effectively by such a pager when the information is in the form of voice or graphics or when the amount of information is large.

Some television receivers having a capability of receiving teletext information can receive information on stock quotes or commodity information. However, in such a television, the same information is transmitted to everyone who has a similarly equipped television, and a private message (i.e., directed to a particular recipient) cannot be received.

SUMMARY OF THE INVENTION

Accordingly, one object of the present invention is to provide a television receiver which can receive a text message together with a voice message and output the text message on a television screen while outputting the voice message via a loudspeaker.

Another object of the present invention is to provide a voice/text messaging method using the television receiver.

To accomplish one of the objects above, a television receiver is provided for receiving a voice/text message from one of a plurality of external host computers which store text and voice information. The television receiver includes a storing means for storing at least one telephone number of the host computers. A controller in the television receiver reads out the telephone number stored in the storing means to send an information request signal to a host computer and controls overall operation of the television receiver according to instructions of a user. A modem modulates the information request signal output by the controller to transmit the modulated signal to the host computer and demodulates a text and/or voice information signal received from the host computer. A TV signal receiving means for receiving a TV signal is included in the television receiver, as is a display screen for outputting a video signal and a speaker for outputting an audio signal. A TV signal receiving means includes a signal processor which demodulates the TV signal to generate the TV video signal and the TV audio signal, and separates the information signal received from the host computer into a video information signal and an audio information signal. The signal processor then combines the video information signal with the TV video signal and the audio information signal with the TV audio signal.

To accomplish another one of the objects above, there is provided a voice/text messaging method using a television receiver which includes a modem for modulating an information signal transmitted from the television receiver through a telephone network to a host computer and for demodulating information signals received by the television receiver from the host computer through the telephone network to demodulate text and/or voice information received from the host computer. The method comprises the steps of:

(a) determining whether a key input command requesting a messaging service has been made by a user;

(b) displaying a menu on a TV screen which includes a host-connection option, when it is determined in step (a) that a key input command requesting a messaging service has been made;

(c) connecting a telephone line to a host computer when the host-connection option displayed in step (b) is selected;

(d) displaying a list of the information stored in the host computer for the user, if information for the user is stored;

(e) selecting one of the information on the list; and (f) receiving the selected information and outputting a voice message through a speaker and a video message through a screen.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
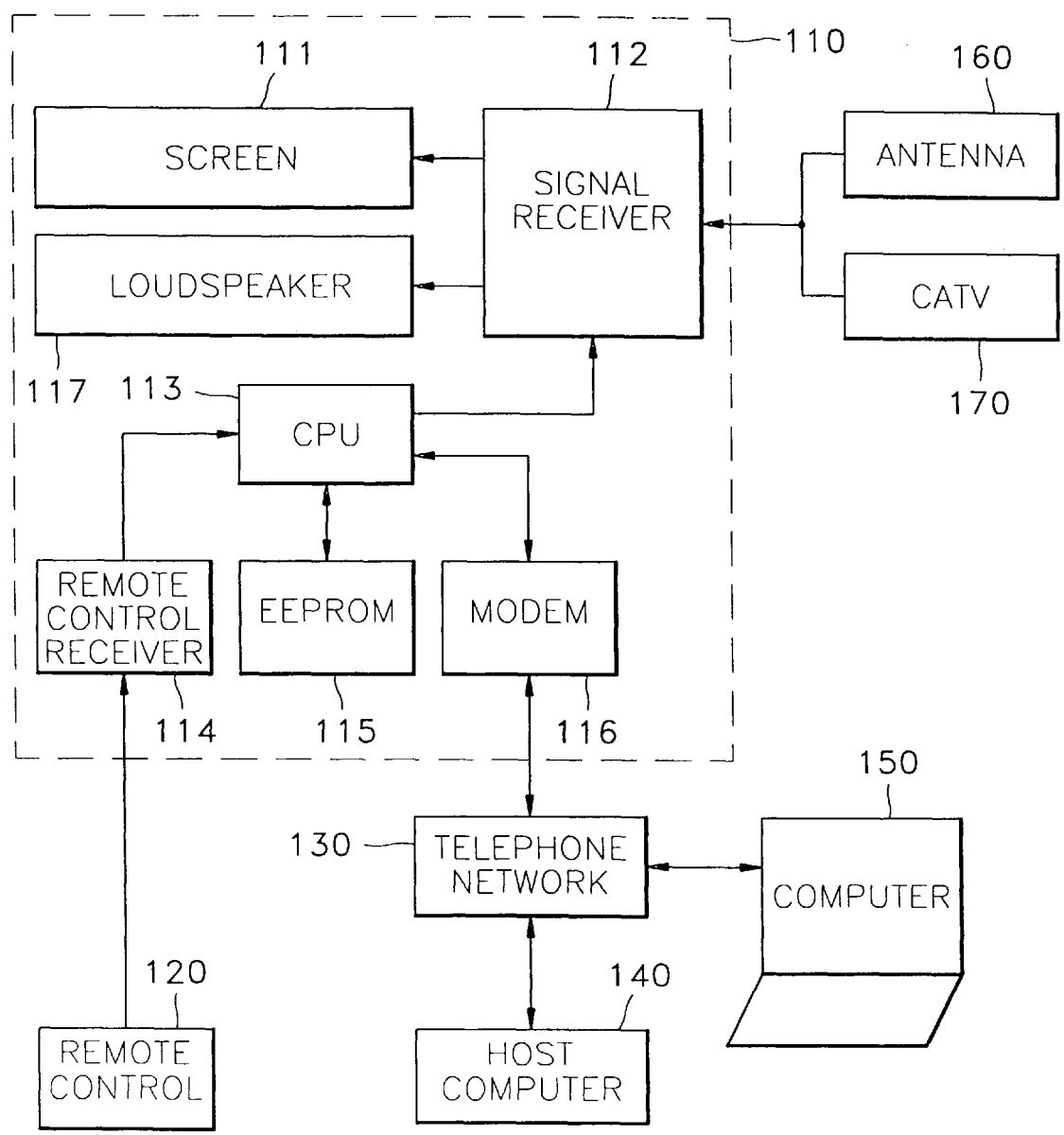
FIG. 1 illustrates a preferred embodiment of a television receiver according to the present invention, along with external equipments for implementing a messaging service.

Referring to FIG. 1, the television receiver of the present invention includes a main body 110, a remote controller 120, a antenna 160, and a cable television (CATV) tuner 170.

The main body 110 of the television receiver is selectively connected to a host computer 140 of a telephone company or an information service provider via a telephone network 130. The host computer 140 can also be accessed via the telephone network 130 by a computer 150 from a remote place in order to transmit or receive a message.

In the main body 110 of the television receiver, a remote control receiver 114 receives a command signal generated by the remote controller 120 and transfers the received command to a CPU 113.

The CPU 113 controls the overall operations of the television receiver according to commands received via the remote control receiver 114. When a message is to be received, the CPU 113 reads the address of the host computer 140 which is stored in the EEPROM 115 and dials the number. When a telephone line is connected, the CPU 113 sends a information request signal to the host computer 140.

An EEPROM 115 stores telephone numbers of the host computer, i.e. telephone numbers of the telephone company or of the information service provider. The EEPROM 115 maintains the stored telephone numbers even though the television is switched-off. Also, the user can change the telephone numbers stored in the EEPROM 115 or add a new number by using the remote controller 120. Meanwhile, when more than one users use the television receiver, a password for each individual is optionally stored in the EEPROM 115 and each of the passwords can be changed in the same manner as changing the telephone number.

A modem 116 modulates the information request signal output by the CPU 113 and transmits the modulated signal to the host computer 140 via the telephone network 130. Also, the modem 116 receives the text and voice information from the host computer 140, and demodulates such information to send the demodulated information signal to the CPU 113.

The CPU 113 receives the demodulated information signal from the modem 116 and adjusts the timing of such signal to be output to the signal processor 112.

The TV signal processor 112 demodulates and amplifies a broadcast signal received from the antenna 160, or from the CATV tuner 170, or a video signal from a video cassette recorder (not shown). Also, the TV signal processor 112 separates the received information, which may include text, graphics, and voice forms of information, into a video information signal and an audio information signal. The processor then combines the video information signal with a TV video signal and combines the audio information signal with a TV audio signal. The TV signal processor 112 then outputs the combined audio signal to the loudspeaker 117, and the combined video signal to the screen 111.

Figure 2:
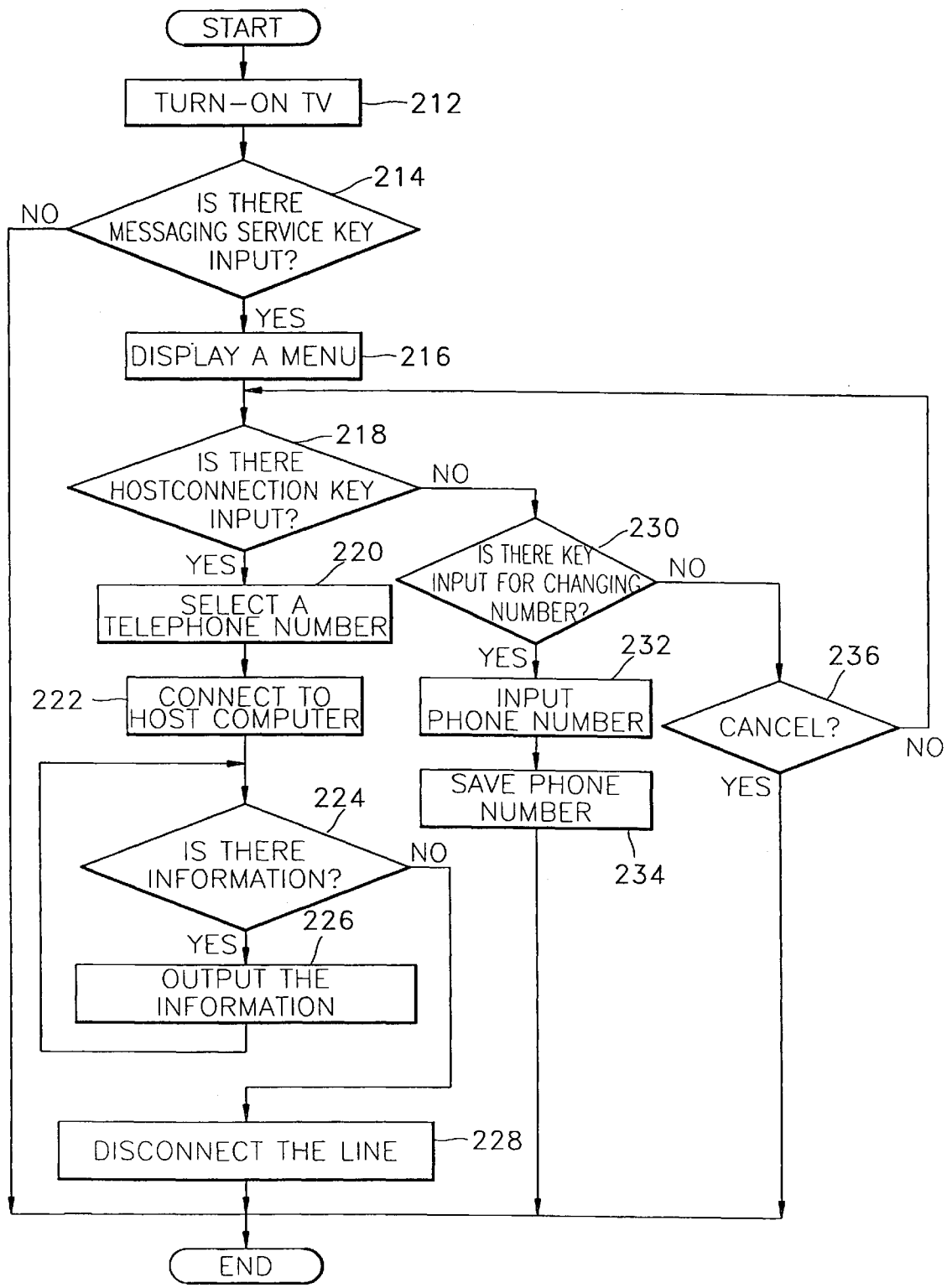
FIG. 2 is a flow chart showing an embodiment of a voice/text messaging method according to the present invention.

FIG. 2 is a flow chart showing an embodiment of a voice/text messaging method according to the present invention. The operation of the television receiver of FIG. 1 will now be described in detail with reference to FIG. 2.

If a person located in a remote place wants to transmit (or "leave") a voice/text message, the person connects the computer 150 to the host computer 140 via the telephone network 130. Once the telephone connection is made the person then transmits to the host computer 140 a message containing text and/or voice information. The host computer 140 then stores such information in its storage unit. The host computer 40 is maintained by, for example, the telephone company or another information service provider.

When a user wants to check what messages has been received, the user presses a menu button for the message service on a remote controller 120. Then, a remote control signal is applied to the CPU 113 through the remote control receiver 114.

Thus, the CPU 113 in the television receiver continuously determines whether a key input has been entered requesting a messaging service (step 214). When it is determined that there has been a key input requesting a messaging service, a menu is displayed on the screen of the television (step 216).

At this time, the user is free to select one of several alternatives on the menu, such as connecting to the host computer, changing the telephone number, and canceling of trying messaging service. Thus, in step 218, the CPU 113 determines whether a key input has been entered to select connection to the host computer.

If it is determined in step 218 that a key input for the host-connection has been entered, the CPU 113 reads out a list of telephone numbers stored in the EEPROM 115 and displays the list on the screen 111 through the signal receiver 112. The user then selects a desired number from the lists of telephone numbers displayed on the screen 111 by using the remote controller 120 (step 220). When a selection of a telephone number has been made, the CPU 113 dials the selected telephone number to connect to the host computer 140. Then, the television receiver 110 is connected to the host computer 140 via the telephone network 130 (step 222).

It is determined whether there is any information in the storage unit of the host computer 140 which is intended for receipt by the user (step 224). If there are some information items stored for the user, a list of the information items in the host computer 140 is transmitted to the television receiver 110 and displayed via the signal receiver 112 on the screen 111. If the user selects an item in the list, the CPU 113 supplies a information request signal to the modem 116 to receive the text and voice information stored in the storage unit of the host computer 140 via the modem 116. The selected information item is then transmitted to the television receiver 110, and output by the television receiver 110 (step 226). Specifically, a voice signal portion of the selected information item is output by the loudspeaker 117 and a video signal portion of the selected information item is displayed on to the screen 111. Afterwards, the user is free to select another information in the list.

If there remain no more information items on the list, or the user wants to quit, the connection is terminated (step 228) and the procedure returns to the step 212 to convert the operation mode of the television receiver 110 into the usual TV-watching mode.

If it is determined at step 218 that the key input is not for the host-connection, it is then determined whether the key input is for a change of the telephone number (step 230). If it is determined in step 230 that the key input is for the change of the telephone number, a message prompting the user to input a new telephone number is displayed on the screen 111. If the new telephone number is input in step 232, the number is stored in the EEPROM 115 (step 234). After storing the new number, the procedure returns to step 212.

If it is determined in step 230 that the key input is not for the change of the telephone number, a determination is them made whether the key input is for cancellation of attempting messaging service (step 236). If it is determined in step 236 that the key input is for canceling, the procedure returns to the step 212.

If it is determined that the key input is not for canceling of trying messaging service in the step 236, the key input is regarded as being unrecognizable, and the procedure is returned to step 218.

In the another embodiment of the present invention, in which one television receiver is shared by more than one individual (e.g., members of a family, members of a household, college roommates) a password can be assigned to each individual so as to enhance the security of the messaging system or method. In such a case, the passwords are stored in the EEPROM 115 by using the remote controller 120 in the same manner as for storing the telephone number.

As described above, the present invention enables the user to receive a message in a form of text or graphics. Thus, even when voice information cannot be successfully transmitted due to difference in the languages between the sender and the recipient, or in the case that the recipient is deaf, the message information can be transmitted in textual form.

The present invention has been described in terms of preferred embodiments. However, it will be appreciated by those having ordinary skill in the art that various modifications can be made to the described embodiments without departing from the spirit and scope of the invention.

What is claimed is:

1. A television receiver for receiving a message from an external host computer which stores information in voice and text form, the television receiver comprising:

a storing means for storing at least one telephone number of the host computer;

a controller for reading out the telephone number stored in said storing means to send an information request signal to said host computer and controlling overall operation of said television receiver according to instructions of a user;

a modem for modulating the information request signal output by said controller to transmit the modulated signal to said host computer and demodulating a message signal received from said host computer, said message signal containing combined text and voice information;

a TV signal receiving means for receiving a TV signal;

a screen for displaying a video signal;

a speaker for outputting an audio signal; and a TV signal processor for demodulating the TV signal to generate a TV video signal and a TV audio signal, separating the received message signal into a video information signal and an audio information signal, and combining the video information signal with the TV video signal and the audio information signal with the TV audio signal.

2. The television receiver for receiving a message according to claim 1, wherein the message signal received from said host computer is transmitted via a telephone network.

3. The television receiver for receiving a message according to claim 1, wherein said storing means is an EEPROM.

4. The television receiver for receiving a message according to claim 1, wherein said storing means further stores one or more passwords, each one of said one or more passwords being assigned to a particular user who shares the television receiver with other users.

\* \* \* \* \*